United States Patent [19]

Bennett

[11] Patent Number: 4,766,555

[45] Date of Patent: Aug. 23, 1988

[54] SYSTEM FOR THE AUTOMATIC GENERATION OF DATA BASES FOR USE WITH A COMPUTER-GENERATED VISUAL DISPLAY

[75] Inventor: William S. Bennett, Chenango Bridge, N.Y.

[73] Assignee: The Singer Company, Binghamton, N.Y.

[21] Appl. No.: 771,953

[22] Filed: Sep. 3, 1985

[51] Int. Cl.$^4$ .................. G06F 3/153; H04N 7/18
[52] U.S. Cl. .................. 364/518; 364/521; 434/43
[58] Field of Search ............ 364/512, 518, 521, 443, 364/522, 424; 434/35-38, 43

[56] References Cited

U.S. PATENT DOCUMENTS

| | | | |
|---|---|---|---|
| 3,927,948 | 12/1975 | Cox et al. | 364/512 X |
| 4,275,449 | 6/1981 | Aish | 364/512 |
| 4,489,389 | 12/1984 | Beckwith et al. | 364/518 X |
| 4,551,810 | 11/1985 | Levine | 364/512 X |
| 4,641,255 | 2/1987 | Hohmann | 364/518 X |

Primary Examiner—Gary V. Harkcom
Assistant Examiner—H. R. Herndon
Attorney, Agent, or Firm—Barry L. Haley; Douglas M. Clarkson

[57] ABSTRACT

A system for generating digital image data bases automatically that is principally for use in visual systems of simulators and for use when a particular geographic area is not required. A data processing circuit generates high detail realistic images statistically under the control of a control data base. A conflict resolution data base retains data for identifying and for resolving geographic conflicts among features generated for a visual system.

2 Claims, 9 Drawing Sheets

"CULTURAL" DATA BASE

FIG. 3

*"ELEVATION" DATA BASE*

| OBJECT CLASS | OBJECT CLASS | FIX ROUTINE |
|---|---|---|
| ROAD | RIVER | BRIDGE |
| ROAD | POND | REROUTE |
| HILLSIDE | POND | DELETE |
| TREE | BUILDING | DELETE |

SYSTEM FOR THE AUTOMATIC GENERATION OF DATA BASES FOR USE WITH A COMPUTER-GENERATED VISUAL DISPLAY

FIELD OF THE INVENTION

This invention, generally, relates to a system for generating digital image data bases automatically primarily for use with computer-generated visual systems and Digital Radar Landmass visual systems. These visual systems have their principal use in the field of simulation where the images must be very detailed and appear to be as realistic as possible, even if the images are not always of a particular real-world geographical area.

BACKGROUND

Earlier systems for generating data bases for computer-generated images and for Digital Radar Landmass images have been based on hand-modelling or on transformation of Defense Mapping Agency (DMA) digital data bases. In hand-modelling, data bases typically are designed on paper as objects composed of edges and faces, then transferred into a computer data base through a digitizing process or through the direct entry of coordinate data in numerical form.

A somewhat more sophisticated system of hand-modelling utilizes interactive graphics terminals on which objects can be designed with an electronic cursor, eliminating the use of paper drawings. In either case, however, the design process is relatively slow and consumes far more labor than can be afforded if very large areas are to be designed.

In the transformation system, digital data bases available from the Defence Mapping Agency are utilized to provide the raw information about the shape of the ground and certain other characteristics of an actual real scene. Typically, this information is available as a set of ground elevation values at the intersections of a grid, plug latitude-longitude coordinates of points on polygons representing the boundaries of respective features to be depicted.

This data is transformed through a lengthy computer process into the objects, faces, and vertices required to define computer-generated image and Digital Radar Landmass data base entities. However, Defense Mapping Agency data typically does not contain the density of information (by a factor of 100 or more) needed to portray detailed computer-generated images or scenes needed for training in flight near the ground, or detailed digital radar landmass scenes needed to train in the use of synthetic-aperture radar.

OBJECTS AND SUMMARY OF THE INVENTION

A principal object of the present invention is to provide a system of generating detailed data bases for computer-generated image systems or for digital radar landmass image systems.

It is also an important object of the present invention to provide a system for generating data bases automatically for use in a computer-generated image display.

Another object of the present invention is to provide a new and improved system for generating data bases for use in a computer-generated image display for providing images in higher resolution and realistic detail.

Yet another object of the present invention is to provide a new and improved system of generating data bases almost entirely automatically in sufficient detail to be useful for training in flight simulation near the ground or with very-high-resolution radar simulation systems.

A further object of the present invention is to provide a system of generating data bases for computer-generated image displays where the image is high in detail and sufficiently realistic for simulation training purposes.

Briefly, a system for generating data bases automatically for use in a computer-generated image display that is constructed and arranged according to the present invention includes a data processing circuit to generate data bases for high detail realistic images statistically. A first data store contains coarse data about major geographic features and serves to initiate the generation of the images by the data processing circuit. A second data store contains image character data that is related to the data in the first data store to control the action of the data processing circuit in its generation of the high-detail realistic images.

A conflict resolution circuit is connected to the data processing circuit to determine a solution to pairs of image features that should not co-exist at the same geographical location. A final data store is connected to receive the output from the data processing circuit for use by a computer-generated visual system.

The invention accomplishes the above objectives by generating the data bases statistically, based upon a small amount of data describing the character of the landscape, which is made up manually.

The landscape "character" data is in a special "control data base," which is fed into the generation process along with (if desired) some coarse DMA data or some manually-generated data describing a major feature of the area, which can be used as a foundation on which other detail is placed.

An important aspect of the invention is in the form, the content, and the use of the control data base. It might start, for example, with a main road which runs through the area. Off that main road, the users of the system might want secondary roads to appear at intervals, since the character of the landscape being imitated is that it contains such secondary roads.

The records for the secondary roads will contain information on how far apart, on the average, the secondary roads are to be from one another along the length of the main road. Data in the records might also give the average width of the secondary roads, and how far it should be, on the average, from one dogleg in the secondary road to the next, and what angle those dogleg segments should make with one another.

With each of these average values, there is also stored a standard deviation for the parameter, or a similar measure. There might then be farms and ponds strung along each secondary road; and buildings, fields, and trees situated in each farm. All will have parameters (field size, tree height, etc.), each with an average value and a standard deviation or similar measure.

The main starting feature of a data base (the main road in the above example) might come from the coarse data base, or it might come from manual modelling. The automatic program then will consult the control data base for statistics to control the generation of the secondary roads, ponds, farms, trees, and so on—whatever has been put into the control data base. For each item mentioned in the control data base, hundreds or thousands may be generated in the final data base.

In operation, the automatic program will generate random numbers for each of the parameters satisfying the average value and the standard deviation or other measure of dispersion. These will be applied to the objects being constructed and placed in the data base.

Once the data base has been generated, it must be checked for conflicts. For instance, a road might run through a pond, or a stream might run down one hill and up the next. These situations are checked by means of a "conflict resolution data base" which identifies pairs of object types that should not co-exist at the same geoygraphic point (or, if they should, calls for execution of a subroutine which fixes the problem—routes the road around the pond, puts in a bridge, or some similar action).

The result will be a data base filled with objects according to the statistics contained in the control data base and, therefore, having the character described by those statistics.

Other objects and advantages, as well as a complete understanding of the invention, may be obtained from the following detailed description when considered in connection with the accompanying drawings.

DETAILED DESCRIPTION

Figure 1:
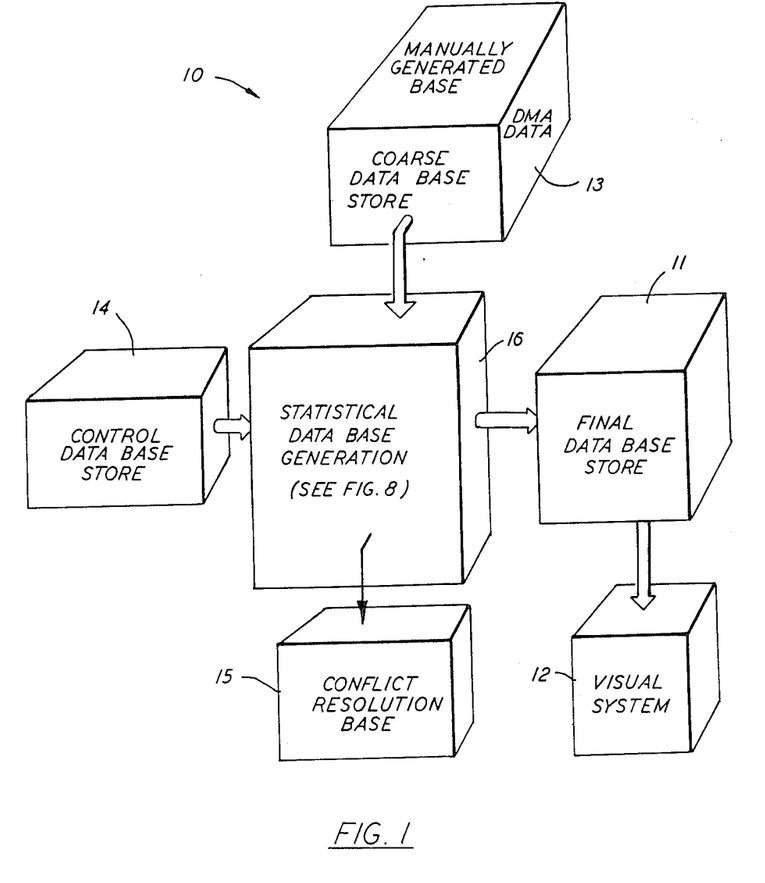
FIG. 1 is a block diagram to illustrate the interconnections between component parts of a circuit constructed in accordance with the principles of the invention.

Referring now to FIG. 1 of the drawings, the numeral 10 identifies a system for automatic generation of a data base in a visual system of a computer-generated image display such as usually used today in the simulation industry. A data base that is generated automatically by the system 10 of the present invention is retained in a final data base store 11 until it is used in a digital visual system 12.

Figure 2:
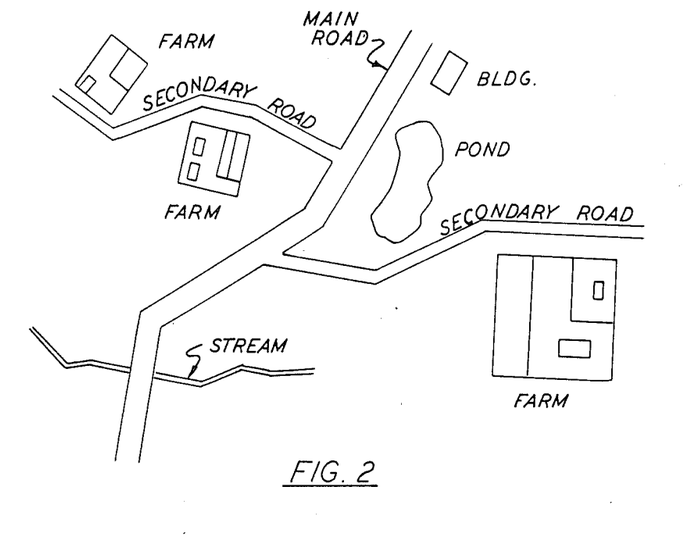
FIG. 2 illustrates, in simplified form, a typical digital image generation data base representation of the data in the final data base store shown in FIG. 1.

FIG. 2 of the drawings illustrates a simplified plan view of a scene represented by one typical data base for display on a digital visual system 12 and which is stored in the final data base store 11. While such a view may be composed of objects that are three dimensional or two dimensional, or even a combination of the two, the view shown in FIG. 2 is a rather simple view composed of objects that are two dimensional as they would appear in a ground plane.

All of the objects in the view in FIG. 2, whether they are composed of two dimensions or three dimensions, basically consist of polyhedra. Such polyhedra are composed of polygons which, in turn, are defined by edges that connect various vertices.

FIG. 2 of the drawings illustrates how much of this additional information would be clearly visible from such a low-level flight, and it is this information that is added automatically to the information available from the Defense Mapping Agency. A study of FIG. 2 of the drawings reveals that there are secondary roads extending from this main road at various points and at various angles, each secondary road being of a predetermined width, length, and segmented. Farms are shown at various points along the secondary roads, and fields, barns and houses are illustrated within the farm outlines. There are many other lower-level features also which could be visible if desired.

Figure 3:
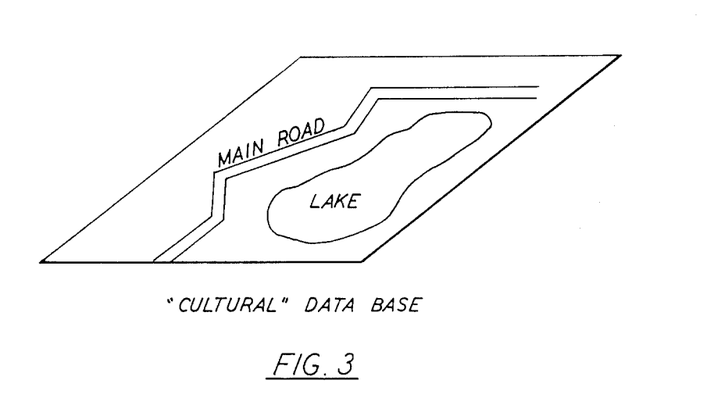
FIG. 3 is a pictorial representation, in perspective, of principal features only (no details) in a scene which is characteristic of "cultural" information normally stored in the coarse data base store, shown in FIG. 1.
Figure 4:
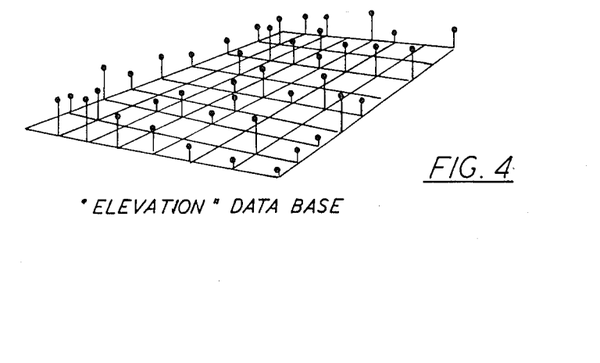
FIG. 4 is a view similar to that shown in FIG. 3 representative of "elevation" information also stored in the coarse data base of FIG. 1.

To explain the development of the image depicted in FIG. 2, reference is made to a coarse data base store 13 in FIG. 1 which will contain information of a "cultural" nature, for two dimensional scenes, as shown in FIG. 3 of the drawings, or "elevation" information, for those scenes that are three dimensional, as shown in FIG. 4 of the drawings. As stated previously, the image of FIG. 2 has no three dimensional characteristics and, therefore, it contains only two dimensional characteristics, or that of FIG. 3.

The information stored in the data base 13 (of FIG. 1) will be only that of a more prominent nature, such as a main road, or a large lake, or a mountain, as the main road illustrated in FIG. 3. In this description of the invention, theses are referred to as "top level features".

In this description, a top-level feature is illustrated as being a main road. However, it could as well have been a large river, a coastline or some similar more prominent structure. This information is readily available from the Defense Mapping Agency, but it is seldom of sufficient detail for the purpose of simulating low-level flight.

Figure 5A:
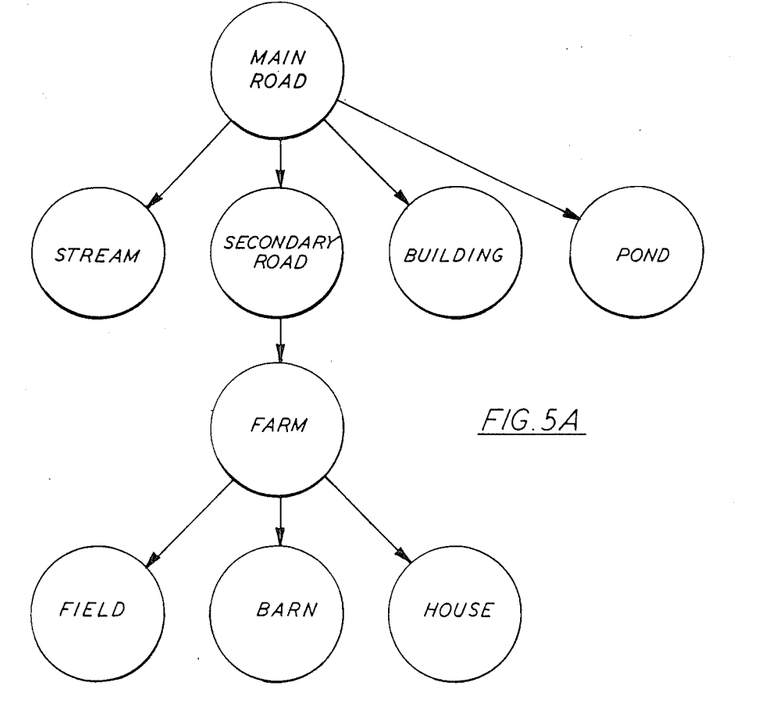
FIG. 5A and FIG. 5B are illustrations for use as an aid in describing the operation of the control data base store of FIG. 1.

A control data base store 14 (FIG. 1) retains records generally representative of such lower-level features. FIG. 5A of the drawings is a representation of the interrelationship of the information in such control data base store 14. In FIG. 5A, the circles represent data records, and the connecting lines represent references from upper level data records to lower level data records.

Figure 5B:
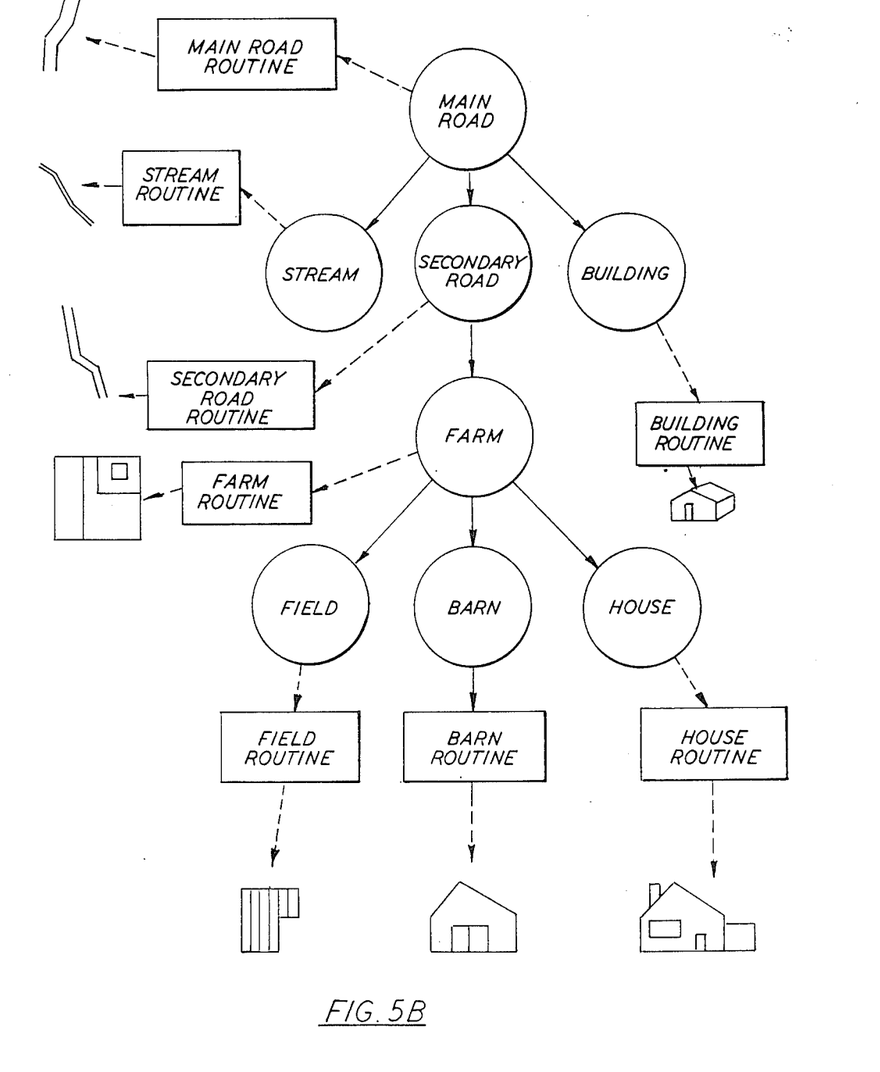

FIG. 5B includes a representation of further details in each of the data records contained in the control data base store 14. Each record references a routine associated with that specific type of object described, such as, for instance, a secondary road or a farm, to show the object class.

Depending on what the object class is, there also will be in the record a different list of parameters that pertain to the given object class. Within each parameter, there is stored an average (or mid-point) value and a measure of the average expected deviation from that average or mid-point.

There will be presented presently an explanation of the difference between "average" and "mid-point" as well as between a "standard deviation" and a "range of scattering". Also, each record contains a pointer or reference downward to the group of object classes lying "below" a given object class; that is, which are to be positioned along, or otherwise associated with, the upper level object class. This will be explained in more detail presently.

Figure 6:
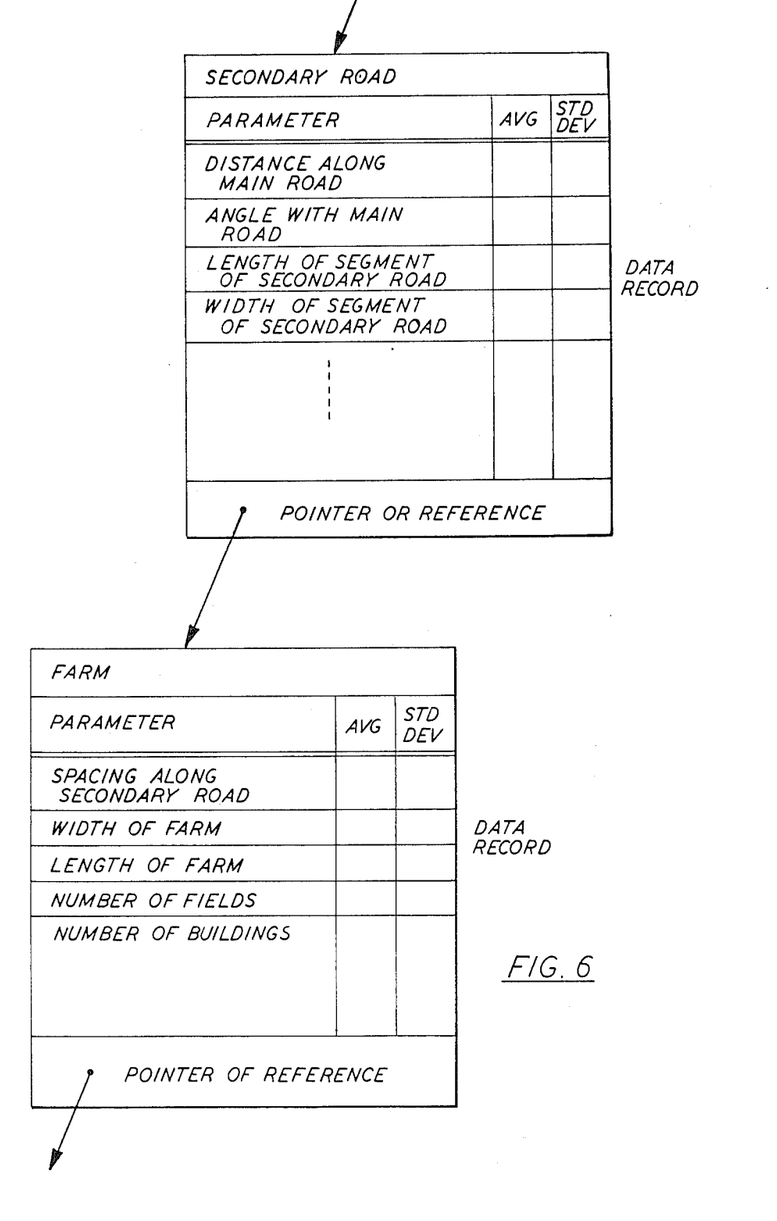
FIG. 6 is an illustration of more detail that is in each of the data records of the control data base store of FIG. 1.

FIG. 6 presents an illustration of one group of particular details, each one associated with a specific object class. The statistical data base generation circuit 16 (FIG. 1) operates on this data and, using the random numbers generated for each of the parameters, builds and places an example of the object in the final image.

Figure 7:
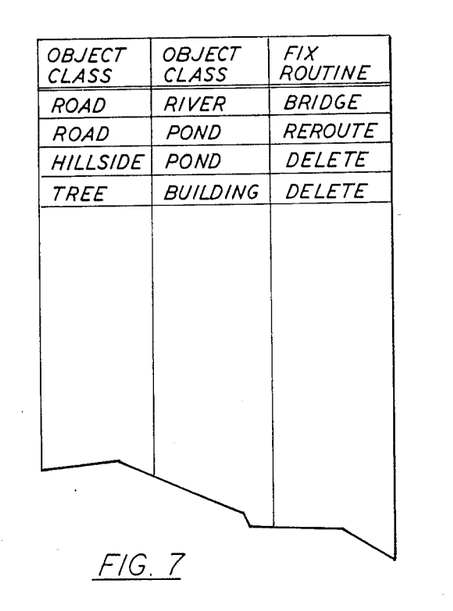
FIG. 7 is an illustration of one type of information that is in the Conflict Resolution Data Base Store shown in FIG. 1.

FIG. 7 is an illustration to indicate generally the type of data contained in a conflict resolution data base 15 (FIG. 1). Basically, the conflict resolution data base 15 is a data store that includes a table which lists pairs of object classes which require special attention should the two object classes overlap in geographic location. Opposite each pair of object classes is the name of a "fix routine" which is to be invoked to resolve the conflict.

Figures 8, 8B:
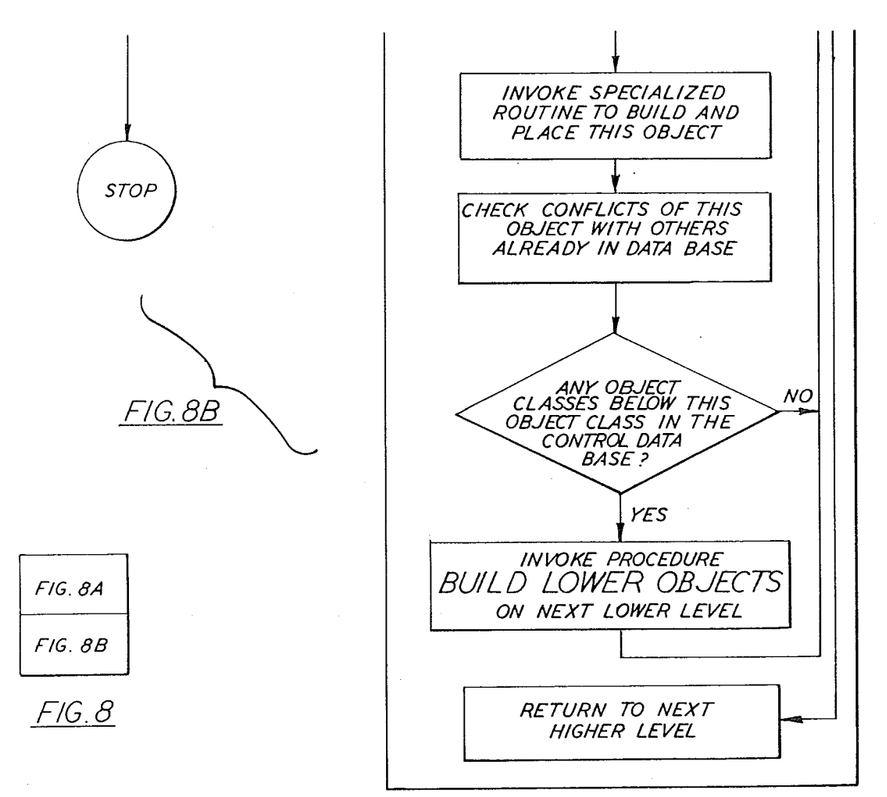
FIGS. 8, 8A and 8B represent a flow diagram illustrating the overall control procedure for the automatic statistical data base generation process shown in FIG. 1.
Figure 8A:
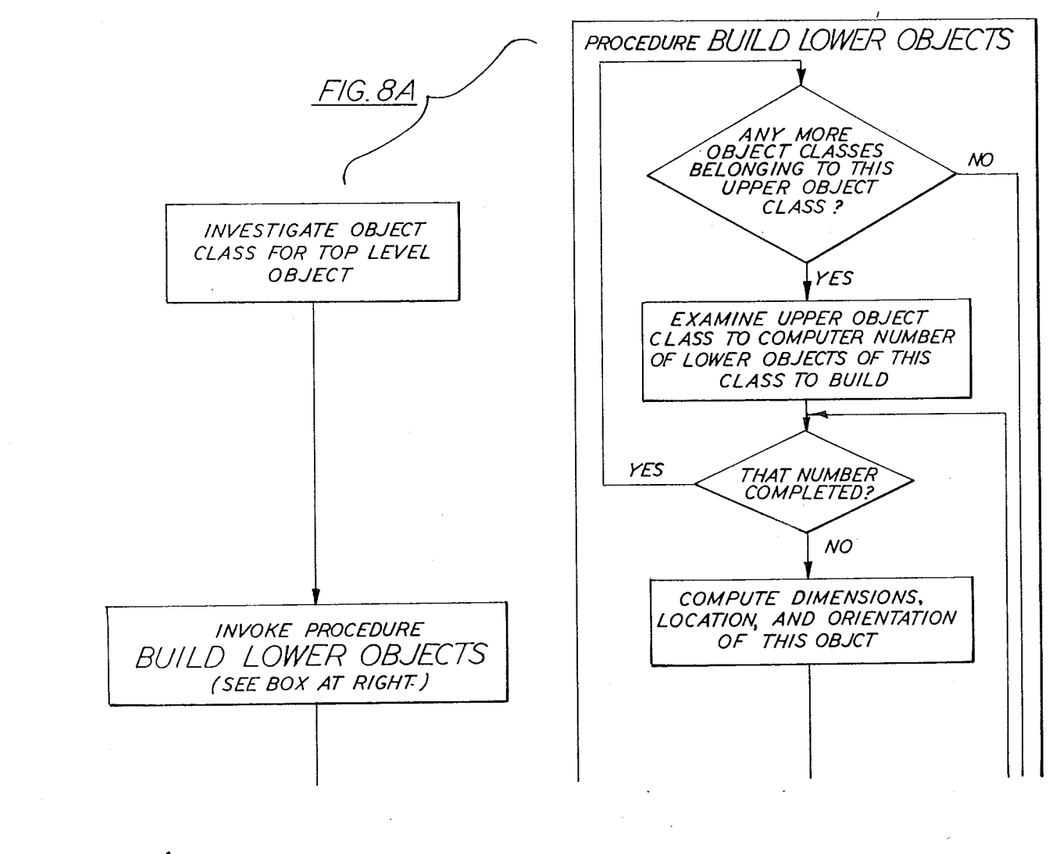

FIG. 8 contains a top-level flow chart which indicates the overall process through which the control data base store 14 (FIG. 1) is accessed, and thereby the subroutines are accessed which build the data base objects. The purpose of the entire process is to progress through the entire tree of object classes contained in the control data base store 14, building for each one some number of objects and inserting them into the final data base store 11. The description of the process, which is a description of the generation of a statistical data base 16 (FIG. 1), is as follows:

Statistical Data Base Generation

The progression through the tree of object classes contained in the control data base 14 begins by addressing the control data base record for a top-level object. Using this record, the procedure "BUILD_LOWER_OBJECTS" is invoked. Upon the completion of invocation of that procedure, the process is completed.

Inside the procedure "BUILD_LOWER_OBJECTS", the process first asks whether there are any remaining object classes belonging to (or "reporting upward to") the current upper level object class. If so, the process then computes the number of objects required to be built of the next set object class. It then iterates through the following steps for that number of times, once for each object to be built:

First, the process computes the dimensions, location and orientation of a particular object by operating on the parameters listed in the control data base record for this object class with a general-purpose randomizing process to be described in more detail below.

Then, the process invokes a specialized routine for this object class to build the object from the randomized measurements. A separate such specialized routine is required for each object class; however, it is possible for a given object class to appear in more than one place in the tree of records in the control data base store 14 and each such instance of that particular object class will use the same specialized routine. In the specialized routine are specific instructions for the construction of the object from its measurements and for its placement into the final data base store 11 in relation to the object of the next level higher.

Next, the process, using the conflict resolution data base, checks this new object against any others existing at the same geographic area of the data base. If any conflicts are found of a type denoted by an object class combination in the conflict resolution data base 15, the conflict resolution routine listed with them is invoked to clear up the problem.

Then, the process asks if there are any object classes below the class of the object just build in the control data base 14. If there are, the process then re-invokes, recursively, another invocation of the procedure "BUILD_LOWER_OBJECTS", on the next level down.

When the required number of objects of any given object class have been constructed, along with any subsidiary to that object class, the process moves on to the next object class on that same level and reporting to the same upper level object class. If there are none left, then that invocation of "BUILD_LOWER_OBJECTS" ends and control is passed back up to the invocation of "BUILD_LOWER_OBJECTS" existing on the next level up.

The result of the above-described processes is to apply the "BUILD_LOWER_OBJECTS" to each object class in the tree of object classes in the control data base store 14. The specialized routines and subroutines used to build objects of a particular type will contain instructions that will, using the random number generation routines described below, determine the relative locations of all the vertices in such objects and will apply these to a standardized structure of vertices, edges and faces representing the given object.

Figure 9:
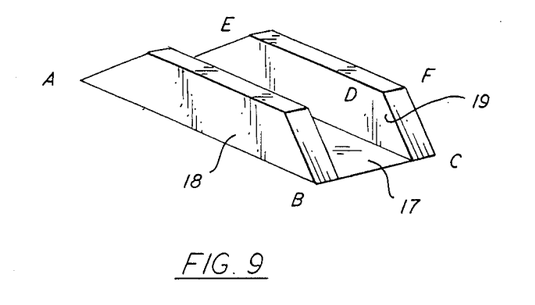
FIG. 9 is an illustration of "a bridge" as depicted by a computer-generated image system with various vertices labeled with letters of the alphabet as an aid in describing the invention.

An example is shown in FIG. 9 of the drawings representing a simple bridge. In this particular case, it contains a flat face 17 representing the floor of the bridge, and it contains two polyhedra 18 and 19 representing the sides of the bridge.

The distance between the vertices A and B represents the length of the bridge, and the distance between vertices B and C represents the width of the bridge. In this particular case, the distance between the vertices D and E is to be scaled proportionally to the distance between the vertices A and B, and the distance between the vertices D and F (representing the width of the side polyhedra) is to remain constant.

The length of the bridge (the distance between A and B) is to be made equal to the width of the particular stream it is to cross, while the width of the bridge (the distance between B and C) is to be made equal to the width of the particular road which requires the bridge. However, the heighth of the side polyhedra is to be varied from one bridge to the next in a random manner, with an average value of ten feet and a standard deviation of four feet.

The determination of a dimension which is to be a random variable is well-known in the art. For example, various ways are given in a reference by B. W. Schmeiser entitled "Random Variate Generation: A Survey," from "Simulation With Discrete Models: A State-of-the-Art View," in the Proceedings of the 1980 Winter Simulation Conference, Dec. 1980, Pages 79–104.

Figure 10:
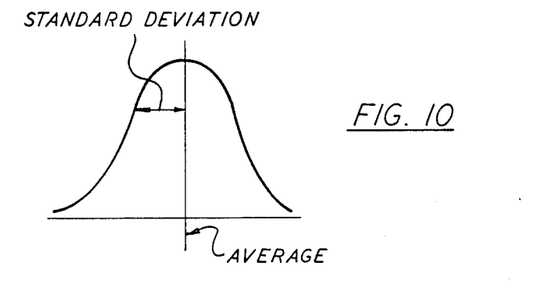
FIG. 10 is an illustration of a bell curve with certain legends used to explain definitions in the description of the invention.
Figure 11:
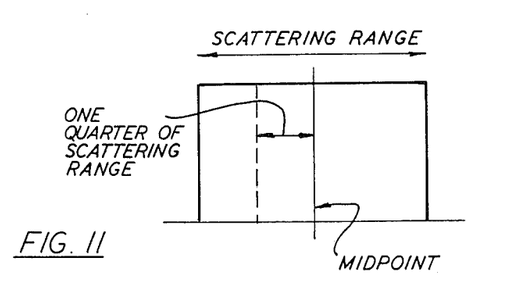
FIG. 11 is an illustration of a rectangular "curve" used as an aid in the description in defining certain analogous terms.

For the purposes of completing the description of the present invention, however, a very simple way to determine a dimension which is to be a random variable is explained with reference to FIGS. 10, 11, and 12 of the drawings.

While any of the ways known in the prior art may be used, the way illustrated in the drawings is based upon the use of different values as will now be described. For example, a "mid-point value" is determined rather than an "average value", and a "range of scatter" is determined rather than a "standard deviation". These are illustrated in FIG. 10 and in FIG. 11.

Figure 12:
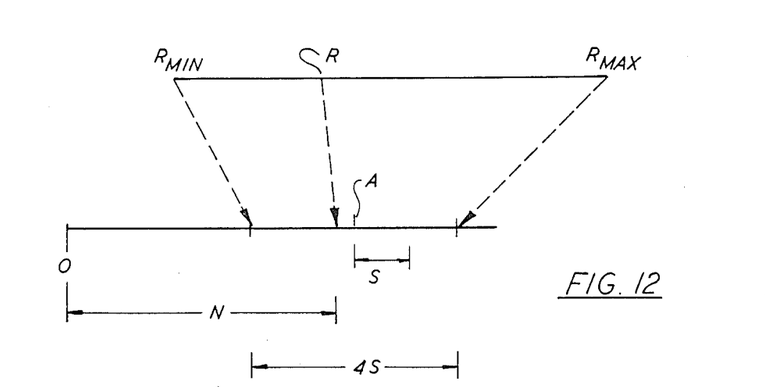
FIG. 12 is an illustration used in the explanation of the mapping of a simple random variable onto a scattering range distribution.

Referring now to FIG. 12 of the drawings, the following definitions are illustrated:

A = mid-point value
S = one-quarter of the full scattering range
N = desired randomized value of a variable
$R_{min}$ = minimum of a range of random numbers
$R_{max}$ = maximum of the same range of random numbers
R = random number between $R_{min}$ and $R_{max}$ generated by any random number generation routine or pseudo-random number generation routine.

With the number "R" determined through any random number generation routine or pseudo-random number generation routine, a corresponding value of the variable of interest, "N", is determined from the following relationship:

$$N = ([R - R_{min}]/[R_{max} - R_{min}])4S + A - 2S$$

The above relationship, using the definitions illustrated in FIG. 12 of the drawings, describes the mapping of a simple random variable value onto the scattering range of a rectangular distribution.

To summarize, the invention provides a way of generating data bases inexpensively and automatically for use in computer-generated image systems, Synthetic Aperture Radar image systems or digital radar landmass visual systems that require a very detailed image that is unusually realistic. The system of the invention does not require substantial hand modelling, and yet, it provides a way of giving an image the general character of any area in the world through the use of, for example, a minimum amount of Defense Mapping Agency digital data.

The system of the present invention accomplishes its objective by generating the data bases statistically based upon a very small amount of data describing the actual character of the image to be enhanced and another small amount of data describing a major feature of the area. The small amount of data describing the major feature can be made up manually or it can come from a Defense Mapping Agency digital data; then the system of the invention generates the data base automatically from this minimal manual data.

The image "character" data is stored in a special "control data base store", which is fed into the generation process along with (if needed) some coarse Defense Mapping Agency data about a major feature of the area, which can be used as a foundation on which other details are placed.

In view of the detailed description herein above, various modifications of the preferred form of the invention will occur to one skilled in this art. Accordingly, the description and modifications are to be considered as illustrative only, the true spirit and scope of the invention being that as defined by the claims appended hereto.

I claim:

1. A system for generating data bases automatically that are ultimately used as visual scene data bases for a computer image generator wherein the final stored image is highly realistic in cultural geographical scene content, the system comprising:
    (a) data processing circuit means for generating digital signals that are storable as a data base for a digital image generator representing images having numerous edges forming polyhedra representing realistic visual cultural objects found in a visual geographical view of the earth's surface statistically in accordance with a predetermined data base generation program;
    (b) first means connected as an input to said data processing circuit means storing data identifying and describing prominent features to be included as a starting point in generating a data base in said data processing circuit means;
    (c) second means connected as an input to said data processing circuit means storing data describing the dominating cultural feature of a geographical area in the form of a hierarchy of features in which lower hierarchy features are for association with higher hierarchy features, in which predetermined attributes of each feature are in terms of an average and a standard deviation, said data influences the statistical generation of data bases by controlling which feature is associated geographically with which feature, the numbers of such features, and dimensions and angles associated with describing such features; and
    (d) third means to store data connected to output from said data processing circuit means for use by said digital image generator.

2. A system for generating data bases automatically as claimed in claim 1 including fourth means to store data describing the identity of, and the resolution of, geographic conflicts among features generated by said data processing circuit means.

* * * * *